United States Patent [19]

Claussen et al.

[11] Patent Number: 5,093,401

[45] Date of Patent: Mar. 3, 1992

[54] AQUEOUS CASTING SOLUTIONS FOR THE PRODUCTION OF LIGHT-POLARIZING SHEETS OR FILMS BASED ON POLYVINYL ALCOHOL

[75] Inventors: Uwe Claussen, Leverkusen; Friedrich W. Kröck, Odenthal, both of Fed. Rep. of Germany

[73] Assignee: Bayer Aktiengesellschaft, Leverkusen, Fed. Rep. of Germany

[21] Appl. No.: 449,018

[22] Filed: Dec. 11, 1989

[30] Foreign Application Priority Data

Dec. 23, 1988 [DE] Fed. Rep. of Germany ....... 3843415
Jul. 1, 1989 [DE] Fed. Rep. of Germany ....... 3921668

[51] Int. Cl.$^5$ ............................................. C08K 5/05
[52] U.S. Cl. .................................... 524/379; 524/557; 524/388
[58] Field of Search .................. 524/379, 388, 557

[56] References Cited

U.S. PATENT DOCUMENTS 3,997,489 12/1976 Coker ................................. 524/388
4,215,169 7/1980 Wysong ............................. 428/220

OTHER PUBLICATIONS

Database Chemical Abstracts, (HOST:STN), 1988, Ref. No. 112(12): 100242e, Columbus, Ohio, U.S.: and PL-A-145 151 (Politechnika Warswawska) 31-0-8-1988.

Primary Examiner—Joseph L. Schofer
Assistant Examiner—Jeffrey T. Smith
Attorney, Agent, or Firm—Sprung Horn Kramer & Woods

[57] ABSTRACT

Casting solutions for the production of light-polarizing films or sheets contain, relative to the sum of weights $(A)+(B)+(C)+(D)=100\%$ by weight, (A) 30–95% by weight, preferably 40–75% by weight, of water, (B) 1–40% by weight, preferably 4–30% by weight, of vinyl, alcohol polymer, (C) 0.01–5% by weight, preferably 0.02–2% by weight, of the dichroic dyestuff, (D) 0.1–75% by weight, preferably 0.5–50% by weight, of one or several organic compounds from the group consisting of aliphatic polyols having 2–6 C atoms, aliphatic ether polyols having 2–6 C atoms, $C_1$–$C_4$-alkyl ethers of aliphatic polyols having 2–6 C atoms, aliphatic aminoalcohols having 2–4 C atoms, amides of aliphatic $C_1$–$C_4$-carboxylic acids, and, if desired, a $C_1$–$C_4$-monoalcohol, and, if desired (E) further additives customary for casting solutions, for example stabilizers, and wherein if using glycerol solely, the weight ratio of glycerol: vinylalcohol polymer is about 0.2–1:1, preferably 0.3–0.5:1.

10 Claims, No Drawings

AQUEOUS CASTING SOLUTIONS FOR THE PRODUCTION OF LIGHT-POLARIZING SHEETS OR FILMS BASED ON POLYVINYL ALCOHOL

The invention relates to aqueous casting solutions for the production of light-polarizing sheets or films based on polyvinyl alcohol.

It is known to add dichroic chromophores to completely or partially hydrolyzed polyvinyl acetate, in order to produce therefrom polarizing sheets.

Until now, it has been very predominantly the iodine-containing polarizers based on polyvinyl alcohol sheets which have found industrial application, for example in passive liquid-crystal displays for the visualization of information. The active agent of these films is the iodine/polyvinyl alcohol complex [M. M. Zwick, J. Appl. Polym. Sci.; 9, 2393–2424 (1965)], which admittedly absorbs a wide band of daylight, but not all of it. In the short-wave (orange-yellow) region, a "hole" is present, i.e. a region of diminished extinction, which is the reason that the sheets have a characteristic blue colour.

An important critical parameter of a display is the readability in various light conditions; it is usually stated as "perceived contrast ratio" (PCR). From this, it follows that, on the one hand, transmission in the blocked setting should be made as small as possible (readability in the dark), and, on the other hand, as large as possible in the transmission setting (readability in the light). This requires a very uniform high polarizing power of the filter over the entire spectral range, which can usually not be achieved by means of the iodine sheet.

There has not been a lack of attempts to replace iodine by dyestuff triplets of dichroic dyestuffs, in order to produce a neutral grey colour which has a uniform dichroism. This not only requires a wide range of high-performance dyestuffs, but also a process which allows the dichroism present in the molecule to become effective.

In the case of the customarily used iodine, a previously stretched polyvinyl alcohol sheet is dyed in a conventional manner, in which the ordering of the polymer is duplicated by the chromophore. The ordering is usually expressed by the dichroic ratio (DR) A∥/A⊥ which A∥ denotes the extinction in the blocked position and A⊥ the extinction in the open position (G. Baum: Optical Engineering 16, 291, 1977).

The same dyeing process can be used in the presence of dichroic dyestuffs, which leads only to a moderate order parameter (U.S. Pat. No. 4,514,559).

The alternative is to apply the dyestuff to the unstretched sheet. Either an unstretched polyvinyl alcohol sheet is used (JP 61/255,304), or the polymer is dyed in the mass. Due to the temperature sensitivity of polyvinyl alcohol, the latter is only possible by adding a dyestuff to a solution of the polymer. The solvents are usually water or water-containing mixtures of organic solvents. After casting, this gives dyed sheets which are dichroic when stretched. However, the dichroism thus obtained is not sufficiently high for industrial application.

The anhydrous polyvinyl alcohol film is rigid, tough and relatively hard. It is known that additives of compounds which contain hydrophilic, strongly polar groups have plasticizing properties. Thus, attempts to affect the properties by additions of 5–17% by weights of glycerol, relative to the sum of the weights of glycerol and polyvinyl alcohol, have been disclosed. (Derwent 32,063 D/18, Derwent 86 257,411/39, U.S. Pat. No. 4,440,541).

Nevertheless, all preparation variations have so far only produced moderate dichroic results, which is the reason that the polarizing sheets which are based on dyestuffs have so far not been able to prevail against the iodine sheet, although they are considerably more resistant than the iodine sheets when exposed to heat or moisture. No experimental results in which the change in dichroism of the dyestuffs in the matrix by means of additives has been described have been disclosed.

Surprisingly, it has now been found that the casting solutions according to the invention are suitable for the production of dyestuff-containing light-polarizing sheets or films which are based on polyvinyl alcohol and have increased dichroism of the dyestuffs in the matrix.

The casting solutions according to the invention for the production of light-polarizing films or sheets contain, relative to the sum of weights (A)+(B)+(C)+(D)=100% by weight, (A) 30–95% by weight, preferably 40–75% by weight, of water, (B) 1–40% by weight, preferably 4–30% by weight, of vinyl alcohol polymer, (C) 0.01–5% by weight, preferably 0.02–2% by weight, of the dichroic dyestuff, (D) 0.1–75% by weight, preferably 0.5–50% by weight, of one or several components from the series consisting of aliphatic polyols having 2–6 C atoms, aliphatic ether polyols having 2–6 C atoms, $C_1$–$C_4$-alkyl ethers of aliphatic polyols having 2–6 C atoms, aliphatic aminoalcohols having 2–4 C atoms, amides of aliphatic $C_1$–$C_4$-carboxylic acids, and additionally if desired a $C_1$–$C_4$-monoalcohol and, if desired, (E) further additives customary for casting solutions, for example stabilizers and if using glycerol solely the weight ratio glycerol: vinylalcoholpolymer is about 0.2–1:1, preferably 0.3–0.5:1.

The amount of $C_1$–$C_4$-monoalcohols is preferably 0.5–60% by weight, particularly preferably 3–50% by weight, relative to the sum of weights (A)+(B)+(C)+(D)=100% by weight.

The polyvinyl alcohols used are preferably polymers which have been prepared by complete or partial hydrolysis of polyvinyl acetate, in particular types which in 4% strength aqueous solution have a viscosity of >4 mPa.sec$^2$ at 20° C., preferably 20–70 mPa.sec$^2$ at 20° C., and the degree of hydrolysis of >80 mol %, preferably 85–∥ 100 mol %.

The dichroic dyestuffs are those which are usually used in light polarizing films or sheets. These dyestuffs are disclosed, for example, in the following publications: W. Hanle, H. Scherer, Zeitschrift fur Naturforschung 6 a (1951), p. 437–439; U.S. Pat. No. 4,514,559; EP 182,632; JA 59/145,255; JA 60/156,759; JA 60/159,705; JA 60/168,743; JA 60/230,606; JA 61/255,304; JA 61/275,703; JA 61/275,704.

In particular, it is also possible to use dyestuffs which, in the form of the free acid, conform to the formula

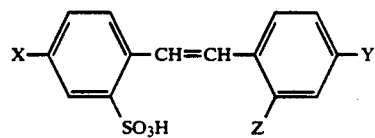

in which
Z signifies H or —SO₃H and

X, Y signify —N=N—R, —CF$_3$, —CONH$_2$, —CONHR$^1$, —CONR$^1$R$^2$, —COOH, —COOR$^1$, —CN, —NH$_2$, —NHR$_1$, —NR$^1$R$^2$, —OH, —OR$^1$, —NHCOR$^1$, halogen, —OCOR$_1$, NO$_2$, or a substituted or unsubstituted heterocyclic radical, R signifies an aryl or heterocyclic radical, preferably the radical of a carbocyclic-aromatic or -heterocyclic coupling component, preferably of the benzene, naphthalene or pyrazolone series and R$^1$, R$^2$ signify alkyl, cycloalkyl, aryl or aralkyl, which may be interrupted by O and/or S, and in which the radicals mentioned for R, R$^1$ and R$^2$ can be substituted, with the proviso that at least one radical X or Y is a group of the formula —N=N—R.

The dyestuffs are preferably used in such concentrations that the films or sheets obtained contain 0.025-10% by weight, particularly preferably 0.5-6% by weight, of the dyestuff and 1-20% of glycerol, relative to the polymer.

Examples of aliphatic polyols (diols, triols) having 2-6 C atoms are: ethylene glycol, trimethylolethane, trimethylolpropane, tetramethylolethane, sorbitol, mannitol, glycerol.

Examples of aliphatic ether polyols having 2-6 C atoms are: diethylene glycol, triethylene glycol. Examples of C$_1$-C$_4$-alkyl ethers of the polyols mentioned are: ethylene glycol monomethyl and dimethyl ether, ethylene glycol monoethyl and diethyl ether, diethylene glycol monomethyl and dimethyl ether, diethylene glycol monoethyl and diethyl ether.

Examples of aliphatic C$_2$-C$_4$-amino alcohols are: propanolamine, ethanolamine.

Examples of amides of aliphatic C$_1$-C$_4$-carboxylic acids are: N,N-dimethylformamide, acetamide, N-methylpyrrolidone, pyrrolidone, ε-caprolactam.

Examples of C$_1$-C$_4$-alkanols are methanol, ethanol and propanol.

It is particularly preferred to use mixtures, in particular mixtures containing glycerol, such as glycerol/dimethylformamide (DMF), glycerol/methanol, glycerol/ethylene glycol monomethyl ether and glycerol/ethylene glycol dimethyl ether mixtures and corresponding mixtures which instead of glycerol contain another of the polyols mentioned.

After casting, the films or sheets are stretched uniaxially at room temperature or elevated temperature (80°-160° C., preferably 120°-140° C.) in a ratio of 1:2 to 1:10, preferably 1:4 to 1:8.

The light-polarizing films or sheets produced preferably have a thickness of 10-150μ.

If desired, the dyestuff-containing films can also be subjected to an after-treatment, for example with aqueous boric acid solution, in order to improve the light permeability or the polarization coefficient. The conditions under which this after-treatment is carried out can vary, depending on the film material and dyestuff. Preferably, it is carried out by means of a 1-15% strength by weight, particularly preferably 5-10% strength by weight, boric acid solution at 30°-80° C., particularly preferably 50°-80° C. Preferably, surfactants and, if desired, inorganic salts are added to the boric acid solution. The surfactants can be non-ionic, cationic or anionic; preferably, they are non-ionic. Examples of non-ionic surfactants are: addition products of ethylene oxide with higher alcohols or addition products of ethylene oxide with nonylphenol. Preferably, 0.005-0.5% by weight, particularly preferably 0.02-0.2% by weight, of surfactant is used, relative to the water. Suitable inorganic salts are preferably sodium sulphate and furthermore potassium sulphate, sodium chloride, potassium chloride, sodium nitrate, potassium nitrate. Relative to the water, preferably 0.1-5% by weight, particularly preferably 0.3-3% by weight, of inorganic salts are used. If desired, this can be followed by a fixation treatment by means of an aqueous solution of a high-molecular-weight cationic compound.

The light-polarizing films or sheets can be compounded or laminated with other materials in a manner known per se. Examples of suitable protective coatings are sheets made of a tetrafluoroethylene/hexafluoroethylene copolymer or a different fluorohydrocarbon resin, a polyester, polyolefin or polyamide resin, preferably cellulose ester, in particular cellulose (tri)acetate, -propionate, -butyrate, polycarbonate.

EXAMPLE 1

0.05 g of salt- and additive-free dyestuff of the formula

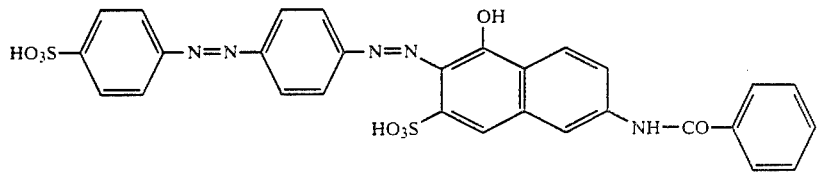

and 4.95 g of ®Mowiol 28-99 (hydrolyzed polyvinyl acetate; degree of hydrolysis 99.4±0.4 mol %; viscosity of the 4% strength aqueous solution at 20° C.=28±2.0 mPa.sec$^2$; from Hoechst AG) are dissolved in 95 g of water to give a clear solution. The amounts of additive listed in Table 1 are added to this solution, and the mixture is thoroughly mixed. The mixture is applied to a glass plate by means of a knife to give a 500μ thick layer, which is dried, peeled off from the support and stretched at 130° C. by 700%.

This gives dichroic ratios (DR) which considerably surpass those of the sheets prepared without any additive.

Table 1 g of additive 4 glycol monomethyl ether
1 ethylene glycol
1 tetraethylene glycol
1 diethylene glycol
1 triethylene glycol
1 trimethylolethane
1 sorbitol
1 N,N-dimethylformamide
1 N-methylpyrrolidone
1 glycerol + 2 n-propanol
1 glycerol + 2 N,N-dimethylformamide
1 glycerol + 1 diethylene glycol 2 glycerol + 2 methanol
2.5 glycerol + 5 methanol
2.5 glycerol
1.25 glycerol

EXAMPLE 2

Analogously to Example 1, sheets made of ®Mowiol 28-99 containing 1% by weight, relative to the polyvinyl alcohol, of the following dyestuffs are produced:

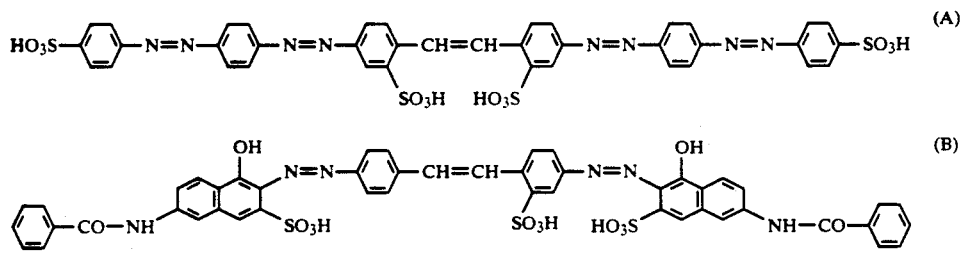

Upon addition of the additives listed in Table 2, sheets having high dichroic ratios are obtained.

TABLE 2

| Dyestuff | g of additive |
|---|---|
| A | 5 methanol + 2.5 glycerol |
| B | 5 methanol + 2.5 glycerol |

EXAMPLE 3

Analogously to Example 1, sheets made of ®Mowiol 4-98 (hydrolyzed polyvinyl acetate, degree of hydrolysis 98±0.4 mol %; viscosity of the 4% strength aqueous solution at 20° C.: 4±1.0 mPa.sec$^2$; from Hoechst AG) instead of ®Mowiol 28-99 and containing the following dyestuffs are produced:

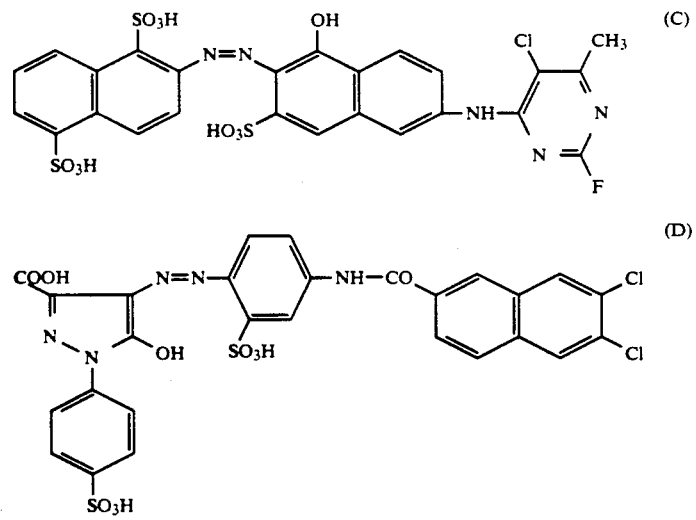

Upon addition of the additives listed in Table 3, sheets which have high dichroic ratios are obtained.

TABLE 3

| Dyestuff | g of additive |
|---|---|
| C | 5 methanol + 2.5 glycerol |
| D | 5 methanol + 2.5 glycerol |

EXAMPLE 4

Analogously to Example 1, a sheet made of ®Mowiol 40-88 (hydrolyzed polyvinyl acetate, degree of hydrolysis 87.7±1.0 mol %; viscosity of the 4% strength aqueous solution at 20° C.: 40±2.0 mPa.sec$^2$; from Hoechst AG) instead of ®Mowiol 28-99 and containing the dyestuff listed in Example 1 is produced.

Upon addition of the additives listed in Table 4, sheets which have high dichroic ratios are obtained.

Table 4 g of additive 0.5 glycerol +
5 glycol monoethyl ether
1 glycerol + 2 DMF

EXAMPLE 5

0.2 g of dyestuff (B) (see Example 2) is dissolved in 100 g of hot water. 10 g of glycerol are added to this solution, and the mixture is allowed to cool. 19.8 g of ®Mowiol 28-99 are stirred into the cooled solution. After stirring for one hour at room temperature, the mixture is heated to 90° C. and stirring is continued at this temperature, until after about 4 hours a homogeneous mixture has been formed. At 50° C., 5 g of methanol are then slowly stirred in. The warm solution is filtered through a filter press, while injecting air, and then degassed by evacuation for a short time. The casting solution is pourable and stable at 60°-70° C. A sheet is produced by applying the warm casting solution of 60°-70° C. by means of a 500μ knife to a support which has been pre-heated to about 50° C. (glass, hydrophilized PE sheet etc.), and the layer obtained is then dried. This gives an approximately 37μ thick film, which can be peeled off. After stretching of the sheet at 130° C. by 740%, a sheet is obtained which has a thickness of 13.6μ and a dichroic ratio of 37.8.

Alternatively, the above warm solution of 60°-70° can be poured onto a rotating wheel (diameter about 20 cm) preheated to about 50° C. from a casting machine to give a layer thickness of about 120μ. After one rotation, the sheet is dry and can be peeled off continuously; it has a thickness of about 20-30μ. After stretching at 130° C., a sheet is obtained which has a thickness of 14.5μ and a dichroic ratio of 35.2.

EXAMPLE 6

0.8 g of pure dyestuff of the formula mentioned in Example 1 is dissolved in a mixture of 260 ml of water, 40 g of glycerol and 140 g of methanol with heating. 79.2 g of ®Mowiol 28-99 are then added with stirring, and the mixture is kept at 60°-70° C. for a few hours. After filtration, the warm solution is applied by means of a 500μ knife to a support preheated to about 50° C., and the layer is dried. This gives a 64μ thick film which after stretching has a thickness of 22μ and at the absorption maximum shows a dichroic ratio of 31.5.

EXAMPLE 7

The experiment described in Example 6 is repeated, using 1.28 g of a mixture containing equal parts of the dyestuffs from Example 2 and a solution of 220 ml of water, 200 g of methanol, 40 g of glycerol and 52 g of ®Mowiol 28-99. The deep ruby-red sheet has a thickness of 24μ after stretching and, in the visible part of the spectrum between 400 nm and 630 nm, a dichroic ratio of >20 to 35 at an optical density of about 6 in the absorption state.

We claim:

1. A casting solution for the production of light-polarizing films or sheets, said casting solution containing, relative to the sum of weights (A)+(B)+(C)+(D)=100% by weight, (A) 30-95% by weight of water, (B) 1-40% by weight of vinyl alcohol polymer, (C) 0.01-5% by weight of dichroic dyestuff, (D) 0.5-50% by weight of a $C_1$-$C_4$-monoalcohol in combination with one or several organic compounds selected from the group consisting of ethylene glycol, trimethylolethane, trimethylolpropane, tetramethylolethane, mannitol, glycerol, diethylene glycol, triethylene glycol, ethylene glycol monomethyl ether, ethylene glycol dimethyl ether, ethylene glycol monoethyl ether, ethylene glycol diethyl ether, diethylene glycol monomethyl ether, diethylene glycol dimethyl ether, diethylene glycol monoethyl ether, diethylene glycol diethyl ether, aliphatic aminoalcohols having 2-4 C atoms, and amides of aliphatic $C_1$-$C_4$-carboxylic acids.

2. Casting solution according to claim 1 which contains a polyvinyl alcohol which has been prepared by hydrolysis of polyvinyl acetate and has a degree of hydrolysis of >80 mol %.

3. Casting solution according to claim 2, which contains (A) 40-75% by weight of water.

4. Casting solution according to claim 2, which contains (B) 4-30% by weight of vinyl alcohol polymer.

5. Casting solution according to claim 2, which contains (C) 0.02-2% by weight of dichroic dyestuff.

6. Casting solution according to claim 1 which contains a compound from the series consisting of glycerol, ethylene glycol, trimethylolethane, trimethylolpropane, tetramethylolethane, mannitol, diethylene glycol, triethylene glycol, ethylene glycol monomethyl and dimethyl ether, ethylene glycol monoethyl and diethyl ether, diethylene glycol monomethyl and dimethyl ether, diethylene glycol monoethyl and diethyl ether, propanolamine, ethanolamine, N,N'-dimethylformamide, acetamide, N-methylpyrrolidone, pyrrolidone, ε-caprolactam, methanol, ethanol, propanol.

7. Casting solution according to claim 1 which contains a glycerol/dimethylformamide (DMF), glycerol/methanol, glycerol/ethylene glycol monomethyl ether or glycerol/ethylene glycol dimethyl ether mixture.

8. Casting solution according to claim 1 which contains a polyvinyl alcohol which has a viscosity of >4 mPa.sec$^2$ at 20° C. in aqueous solution.

9. Casting solution according to claim 1, which further contains (E) additives customary for casting solutions.

10. Casting solution according to claim 9, wherein the additives customary for casting solutions are stabilizers.

* * * * *

UNITED STATES PATENT AND TRADEMARK OFFICE
CERTIFICATE OF CORRECTION

PATENT NO. : 5,093,401

DATED : March 3, 1992

INVENTOR(S) : Claussen et al.

It is certified that error appears in the above-identified patent and that said Letters Patent is hereby corrected as shown below:

Col. 8, lines 15, 17 & 19    Delete " 2 " and substitute -- 1 --

Col. 8, line 33    Delete " (DMF) "

Signed and Sealed this

Second Day of November, 1993

Attest:

BRUCE LEHMAN

Attesting Officer    Commissioner of Patents and Trademarks